UNITED STATES PATENT OFFICE.

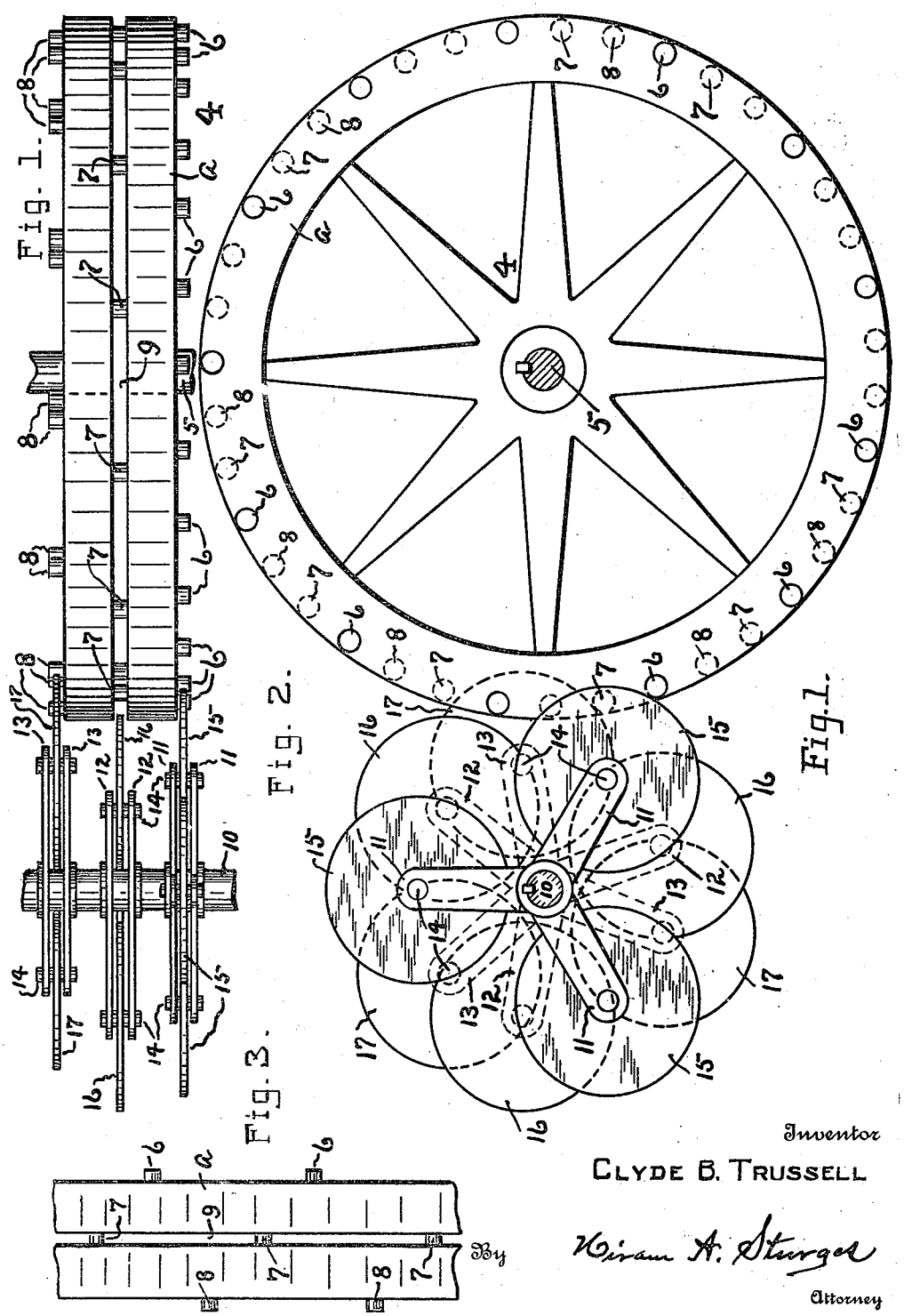

CLYDE B. TRUSSELL, OF OMAHA, NEBRASKA.

GEARING.

1,275,106.  Specification of Letters Patent.  Patented Aug. 6, 1918.

Application filed January 7, 1918. Serial No. 210,706.

*To all whom it may concern:*

Be it known that I, CLYDE B. TRUSSELL, a citizen of the United States, residing at Omaha, in the county of Douglas and State of Nebraska, have invented certain new and useful Improvements in Gearing, of which the following is a specification.

This invention relates to an improved gearing, and has for its object to provide a nest of driving disks movable for engaging a wheel for causing the latter to rotate, the disks being arranged for successive engagement with suitable detents or obstruction-members mounted in staggered relation at or near the periphery of the driven wheel, the invention being of great utility in connection with the wheels of tractors or in other instances where the resistance and stresses to be overcome, for causing rotation, are of greater degree than usual.

The invention includes the combination with an axially mounted wheel provided at or near its periphery with detents arranged in series, the detents of the several series being disposed in staggered relation as compared with each other, of a revoluble shaft having a plurality of radially disposed frames movable therewith, each frame being provided with a plurality of axially mounted disks for successive engagement with the detents of a series for rotating the wheel, among the advantages being that a greater leverage is provided for the driving parts than by any other construction. Since this leverage is greater, the driving parts may have a lighter weight and liability to breakage will be eliminated or reduced to a minimum. Other advantages relate to less expense and inconvenience if breakage occurs, as compared to ordinary gearing, and by use of the invention, stresses will not be directed or limited to a single plane of the wheel, as found in other constructions.

With the foregoing objects in view and others to be mentioned hereinafter, the invention presents a novel construction, combination and arrangement of parts as described herein and claimed, and as illustrated in the accompanying drawing, wherein,—

Figure 1 is a plan view of a gearing embodying my invention. Fig. 2 is a view of the same in side elevation. Fig. 3 is a fragmentary plan view showing a part of the tread of the driven wheel and detents mounted thereon, in staggered relation.

Referring now to the drawing for a more particular description, numeral 4 indicates a wheel to be rotated, its shaft being indicated at 5, said wheel being provided at or near its periphery with numerous detents, these being arranged in series, as indicated at 6, 7 and 8, the detents of the series 7 being disposed in a peripheral groove 9 formed in the tire *a* and uniformly spaced apart, the detents of the series 6 and 8 being uniformly spaced apart and suitably secured upon the respective ends of the tire, as best shown in Fig. 1 of the drawing.

While I have shown a single groove 9 midway between the ends of the tire, I do not wish to limit myself in this respect, and the number of grooves may be increased, if desired, or the groove may be dispensed with, the important feature being that the driven wheel may be provided at or near its periphery with projections or detents arranged in series, said series being disposed longitudinally of the axis of the wheel, and the detents of the several series being disposed in staggered relation as compared with each other.

In order that the driven wheel may be rotated without appreciable vibration, and that the advantages may be derived, as first mentioned, I provide a rotatable shaft 10. Keyed on this last named shaft are a plurality of frames as indicated at 11, 12 and 13, each frame preferably being provided with wrist-pins 14 at uniform distances from each other and at uniform radial distances from the revoluble shaft 10, and upon each pin 14 is mounted to rotate freely, a disk, the disks for the frames 11, 12 and 13 being indicated respectively at 15, 16 and 17.

As described, it will be understood that when the shaft 10 is rotated, the disks 15 will engage, in succession, the series of detents 6 in succession, and after a detent 6 has been engaged, one of the detents 7 will be engaged by one of the disks 16 of the frame 12, and as is obvious one of the detents 8 will be engaged by a disk 17 of the frame 13 after a detent 7 has been engaged by a disk 16, the wheel 4 being moved without shocks or appreciable vibration since one of the disks of a frame engages a detent of one series at the time of the disengagement of a disk of an adjacent frame with a detent of an adjacent series, the stresses, by the arrangement shown and described, being directed in succession to three planes of the wheel 4 since two of the series of detents are mounted upon the ends of the tire, one of said series being disposed between the ends of said tire.

If desired, the series of detents for the wheel 4 and the number of frames for the shaft 10 may be increased or decreased, and the number of detents for each series may be increased, the number of disks being correspondingly increased.

While I have described construction in detail, I do not wish to be understood as limiting myself to any details further than expressed in the appended claims, nor to form, size, proportion of parts or material to be employed, the scope of the invention being determined by said claims.

While the shaft 10 has been described as revoluble, it will be understood that the mechanism will be operable if the shaft 5 is made rotatable for causing a revoluble movement of the shaft 10, and if desired either of the shafts may be revolved or driven to rotate the other shaft.

Having fully described my invention, what I claim as new and desire to secure by Letters Patent is,—

1. In a gearing, an axially mounted wheel provided near its periphery with a plurality of detent-members arranged in series longitudinally of its axis, the detent-members of one series being disposed in staggered relation with reference to the detent members of another series, a revoluble shaft, frame-members disposed at longitudinal intervals of and movable with the revoluble shaft, and a plurality of disks pivotally mounted on said frames for engaging said detent-members.

2. In a gearing, a wheel axially mounted and provided outwardly and longitudinally of its axis with detent-members, a revoluble shaft, frame-members disposed radially of and mounted on the shaft adjacent to each other, and a plurality of disks pivotally mounted on the frame-members for engaging the detent-members of said wheel.

3. In a gearing, a shaft, a wheel mounted on the shaft and having detent members disposed in staggered relation outwardly of its axis, a second shaft, frame-members disposed at longitudinal intervals of and mounted on the second shaft, disks mounted on the frames for engagement with the detent-members of the wheel, one of said shafts being revoluble for causing a revoluble movement of the other shaft.

4. In a gearing, an axially mounted wheel provided outwardly of its axis with a plurality of detent-members arranged in series longitudinally of its axis, the detent members of one series being disposed in staggered relation with reference to the detent members of another series, a revoluble shaft, frame-members mounted at longitudinal intervals of and movable with the revoluble shaft, a plurality of disks pivotally mounted on said frames for engaging said detent-members, the disks of each frame-member moving into engagement in succession with the detent-members of one of the series of said detent-members of said wheel.

5. In a gearing, an axially mounted wheel bearing detent-members outwardly of its axis, said detent-members being arranged in series longitudinally of said axis, a revoluble shaft, frame-members disposed adjacent to each other radially of and movable with the shaft, and a plurality of disks pivotally mounted upon and movable with the frame-members, the disks of each frame-member successively engaging the detent-members of one of said series.

6. In a gearing, a shaft, frame-members mounted at longitudinal intervals upon and movable with the shaft, disks pivotally mounted on the frame-members, an axially mounted wheel provided with a peripheral groove and having detent-members in said groove, a plurality of detent-members mounted on the wheel adjacent to said groove and disposed in staggered relation with reference to each other and to the detent members in said groove, said shaft being revoluble for moving the disks into engagement with the detent-members.

7. In a gearing, a shaft, frame-members disposed radially at longitudinal intervals of and movable with the shaft, a plurality of disks pivotally mounted on said frames, a second shaft, a wheel keyed on the second shaft and provided with a plurality of detent-members arranged in series outwardly and longitudinally of said second shaft, the detent-members of one series being disposed in staggered relation with reference to the detent-members of the other series, one of said shafts being revoluble for moving the detent-members and disks into engagement.

8. In a gearing, a shaft, frame-members axially mounted on the shaft, a plurality of disks pivotally mounted on each frame-member, a second shaft, a wheel axially mounted on the second shaft and provided with a plurality of detent-members arranged in series outwardly and longitudinally of said second shaft, the detent-members of one series being disposed in staggered relation with reference to the detent-members of the other series, one of said shafts being revoluble for causing each of the detent-members of a series to be engaged in succession by the disks of a frame-member.

In testimony whereof, I have affixed my signature in presence of two witnesses.

CLYDE B. TRUSSELL.

Witnesses:
HIRAM A. STURGES,
E. H. CLARK.

Copies of this patent may be obtained for five cents each, by addressing the "Commissioner of Patents, Washington, D. C."